United States Patent Office 3,396,769
Patented Aug. 13, 1968

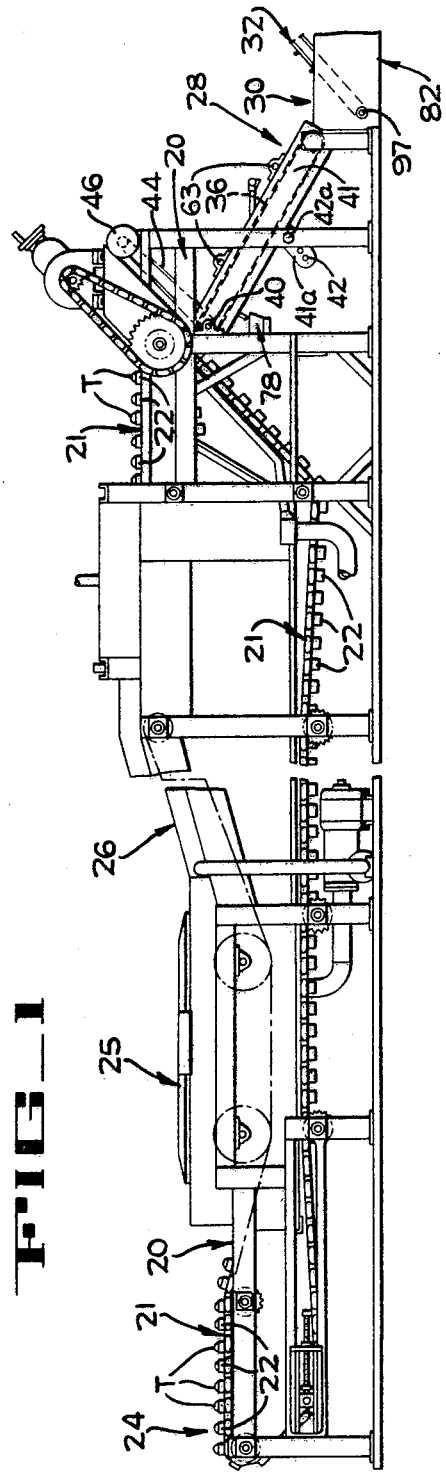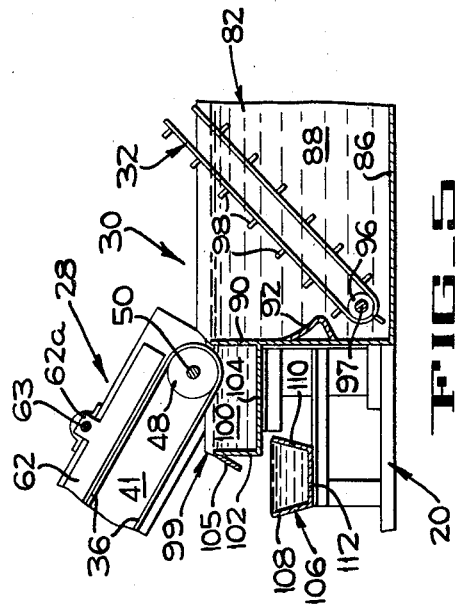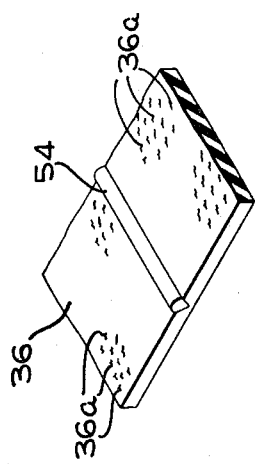

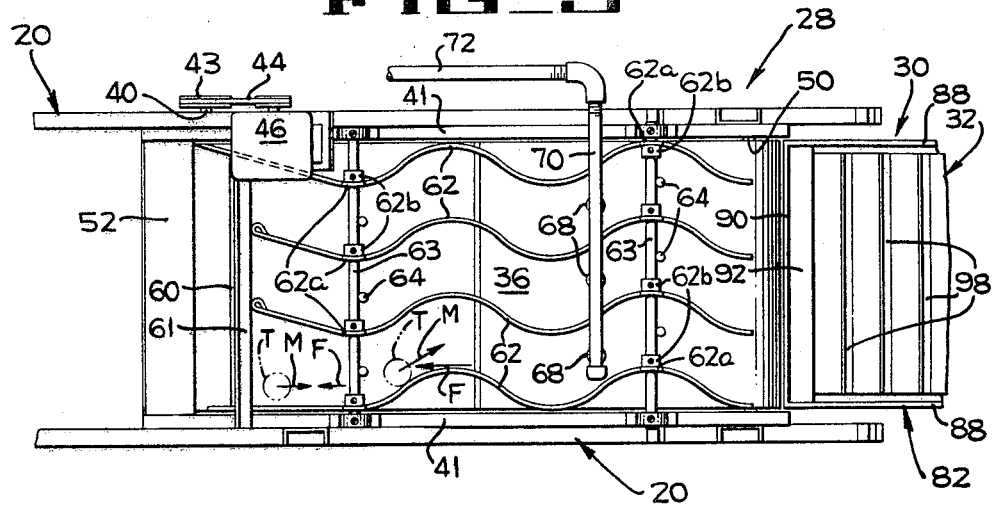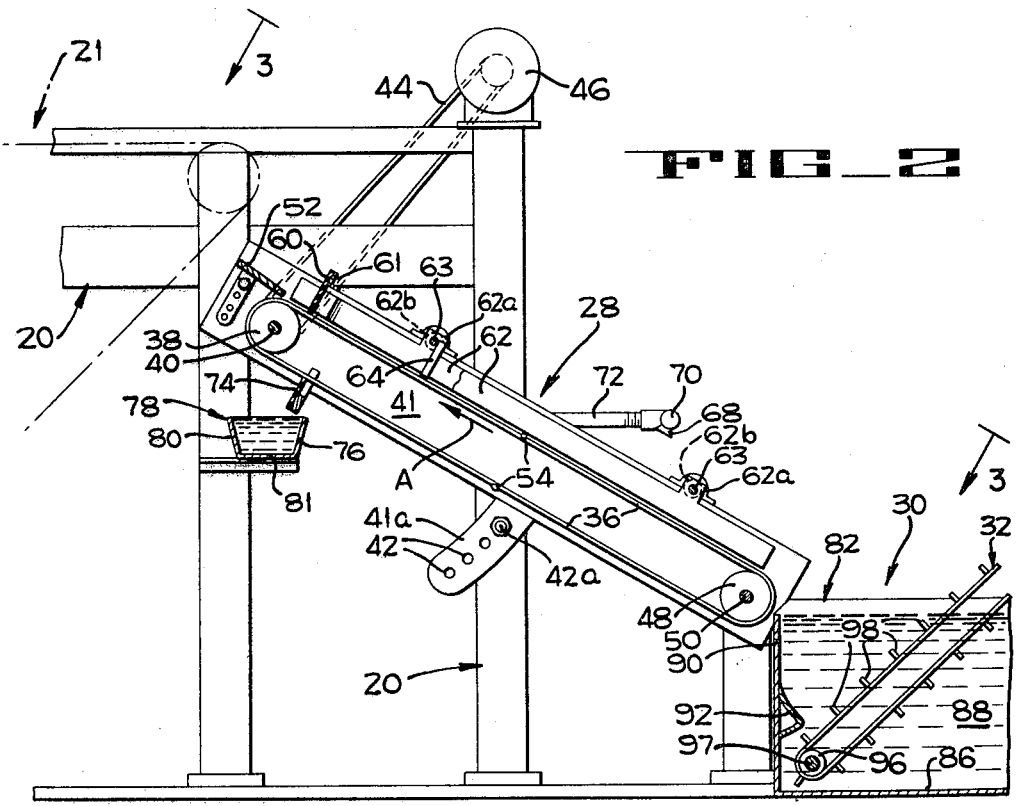

3,396,769
TOMATO PEELING METHOD
Katsuji Hirahara, San Jose, Calif., assignor to FMC Corporation, San Jose, Calif., a corporation of Delaware
Original application Apr. 16, 1965, Ser. No. 448,785, now Patent No. 3,352,338, dated Nov. 14, 1967. Divided and this application Apr. 11, 1967, Ser. No. 630,042
3 Claims. (Cl. 146—231)

ABSTRACT OF THE DISCLOSURE

A method of removing the softened, caustically treated skins from tomatoes by rolling the tomatoes down an inclined, upwardly moving belt, retarding the movement of the tomatoes down the belt, and changing the direction of the path of the tomatoes as they roll down the belt.

CROSS REFERENCES

This application is a division of my copending application Ser. No. 448,785, filed Apr. 16, 1965, now Patent No. 3,352,338.

BACKGROUND OF THE INVENTION

*Field of the invention*

This invention relates to a method for processing fruit, and more particularly relates to a method for removing the caustically treated skins from fruit, such as, tomatoes.

DESCRIPTION OF THE PRIOR ART

Fruit, such as tomatoes, have relatively soft bodies surrounded by relatively thin fragile skins, and must be delicately handled to avoid damaging the bodies or meat portions of the fruit. Caustically treating the tomatoes leaves the fruit with a loosened skin that is readily removable by contacting or brushing against a roughened surface. Normally, regular tomatoes are fruit subjected to a coring and trimming operation wherein parts of the skin are cut away making further removal of the cut and caustically treated skin easily accomplished.

With the advent of improved, relatively coreless varieties of tomatoes, such as the VF–145 and its hybrid forms, Italian pear-shaped, 131 oblongs and other types, it became necessary to modify the peeling operation since the tomatoes were no longer acted upon by a coring unit. In other words, since several of the more recent varieties of tomatoes have small cores, if any, the tomatoes leaving the caustic solution are no longer subjected to a coring and cutting operation, making the subsequent peeling of the skins more difficult.

SUMMARY OF THE INVENTION

In accordance with the present invention it has been found that lye treated tomatoes can be successfully peeled by including the steps of rolling and tumbling the tomatoes down an unsubmerged, firm upwardly moving friction surface, thereby causing sufficiently rapid relative motion of the tomatoes and the surface to break the tomato skin without piercing the skin by the friction surface. In the preferred embodiment of the invention, this relative motion of the tomatoes on the friction surface is provided by rolling the tomatoes down an inclined belt, which moves upwardly contrary to the direction of tomato motion.

The aforesaid rolling action further causes centrifugal flinging of the dislodged skins from the rotating tomatoes.

When a belt is used, as in the preferred embodiment of the invention, it has been found that by directing a spray of water on the tomatoes as they roll down the belt, the tomatoes are not only rinsed of their lye treatment solution, but a thin film of water on the friction surface of the belt to which the dislodged tomato skins adhere and hence are carried away by the belt.

Another feature of the invention is that the rolling of tomatoes down the friction surface is intermittently and momentarily impeded by sinuous baffles so that the tomatoes impinge upon the baffles and richochet among them for further breaking loose the tomato skins from the fruit.

In principle, the tomatoes are rotated and are acted on by a frictional force at varying speeds and in varying directions. This force along with the rotation of the fruit tend to remove the skins from the bodies of the tomatoes.

BRIEF DESCRIPTION OF THE DRAWINGS

FIGURE 1 is a diagrammatic side elevation of one processing line of a caustic fruit treating machine on which the method may be employed.

FIGURE 2 is an enlarged diagrammatic longitudinal vertical section of the skin eliminating unit shown at the right hand end of the machine of FIGURE 1.

FIGURE 3 is an enlarged, diagrammatic plan of the skin eliminating section of the processing line taken along the lines 3—3 shown in FIGURE 2.

FIGURE 4 is an enlarged isometric of a portion of the endless belt shown in FIGURE 3.

FIGURE 5 is a diagrammatic longitudinal section, similar to FIGURE 2 but with parts broken away, showing a modified form of the skin eliminating unit.

DESCRIPTION OF THE PREFERRED EMBODIMENT

In general, a tomato processing machine for carrying out the method comprises an elongated frame support structure 20 on which is mounted an endless chain conveyor 21 (FIG. 1) having an upper run movable toward the right, as shown in FIGURE 1, to carry tomatoes T, that are disposed in caps 22, through a series of processing stations. At a loading station 24, a tomato is placed in each cup. As the tomato is moved to the right, it is carried into a tank 25 in which it is treated for a predetermined time with a caustic solution, such as, lye. After leaving the lye tank 25, the tomato is carried upwardly inside an inclined housing 26 in which excess lye is drained from the tomato and the tomato is exposed to a steam atmosphere for a fixed period of time during which the lye on the skin penetrates to the desired depth to effect loosening of the skin from the flesh of the tomato body. The steam atmosphere in the housing 26 also raises the temperature of the tomato skin to a predetermined optimum peeling temperature. After leaving the housing 26, the tomato is carried by the chain conveyor 21 to the skin eliminating section 28 where the skin is removed from the fruit portion of the tomato. Upon leaving the skin eliminating section, the peeled fruit is passed through an immersion section 30 where it is rinsed and transferred by a conveyor 32 to a trimming station.

With the exception of the skin-eliminating section 28, the above-mentioned members of the processing line are well known in the art, and a further description thereof may be found by referring to Creed et al., U.S. Patent No. 3,096,800, accordingly, the description is incorporated by reference in the present specification.

The skin eliminating section is best shown in FIGURES 2 and 3 and comprises an endless belt 36 trained around a horizontal drive roller 38 which is keyed on an upper shaft 40. The shaft 40 is journalled for rotation in the frame 20 and in a pair of spaced side plates 41 in a well known manner and has mounted on one end a driven pulley 43 (FIG. 3). Each side plate 41 is provided with a protruding bracket 41a. The brackets 41a have a plurality of holes 42 spaced along an arc relative to the shaft 40. To attain a desired inclination of the belt 36, selected holes in each side plate are aligned with holes in the frame 20 and bolts 42a are passed therethrough and securely fastened by nuts in a well known manner. The driven pulley 43 is connected by means of a belt and pulley drive 44 to the rotary shaft of a variable drive electric motor assembly 46, such as a U.S. Varidrive Motor sold by U.S. Electrical Motors, of Los Angeles, Calif. The belt 36 is also trained about a horizontal idler roller 48 which is keyed on a shaft 50. The shaft 50 is journalled for rotation in the side plates 41 at a lower elevation than the shaft 40 in a manner such that the upper run of the belt 36 travels upwardly, as indicated by arrow A, in a longitudinal inclined path. Tomatoes being advanced by the conveyor 21 are dropped onto a flat metal chute 52 which is adjustably mounted to the frame 20 above the roller 38 by any suitable means. The chute 52 guides the tomatoes onto the upwardly moving upper run of the belt 36. The distance each tomato is dropped from the conveyor 21 to the chute 52 may be varied as desired by adjusting the height of the chute; however, it has been found that a distance of several inches is desirable to partially break the loosened skin so as to assist in the subsequent peeling operation. In addition, the surface of the chute could be provided with a roughened rubber surface to increase the breaking of the skin due to the drop.

The belt 36 may be made of any well known flexible synthetic material which is provided with a nibbed, dimpled or otherwise roughened surface 36a which retards sliding of the fruit and aids in breaking or cracking the skin. A typical belt which has proved satisfactory is a Sno-Flake, 3-ply belt made of neoprene and manufactured by the Haultain Champion Co., Inc., of Oakland, Calif. To increase the tumbling action of the tomatoes traveling down the inclined upper run of the belt 36, a plurality of transverse rubber strips 54 (FIG. 4) are vulcanized or otherwise fastened to the outer surface of the belt 36 in a manner so as to impart an additional rotational movement when the strip is carried upwardly by the belt and strikes the tomato. The belt applies a frictional force to the skin of the tomato which tears the skin from the body of the tomato. The rotational or spinning action of the tomato results in a centrifugal force which assists the frictional force applied by the belt to the outer surface of the tomato and flings the broken skin outwardly in sheets away from the main body of the fruit. The skins subsequently mat or adhere to the belt. As a result, the skins are pulled in a direction opposite to the downward path of travel of the tomato which increases the skin peeling action.

Interrupting or delaying means are provided above the belt 36 and in the path of the tomatoes rolling down the upper run thereof and, as best shown in FIGURES 2 and 3, comprise a flexible curtain 60, a set of wavy metal baffles 62 and a plurality of metal pins 64. The curtain, baffles and pins are all disposed normal to the upper run of the belt 36 and are spaced a distance therefrom such that they do not contact the belt but are still in the path of travel of the fruit tumbling downwardly thereon. The curtain 60 is mounted on a transverse angle bar 61, which is fastened on the frame 20 by any suitable means, and is made of a highly flexible material, such as rubber. The curtain 60 serves to momentarily halt the travel of the tomato which is received from the chute 52. This permits the roughened surface of the belt to act on the tomato and begin its tumbling and tearing action. The curtain 60 is separated from the belt a distance sufficient to halt the tomato only temporarily and, as the tomato passes beneath the curtain, it is rapidly tumbled by the inclination of the upper run of the belt 36 and by contact with the upwardly moving roughened surface 36a and the rubber strips 54.

As the tomatoes travel downwardly along the inclined path, they tumble against the undulating baffles 62 which partially impede their downward travel. The baffles are provided with tabs 62a which are fastened, in a position overlying the belt, to transverse bars 63 by collars 62b formed on the tabs and secured to the bars. The bars 63 are mounted on the frame 20 by any suitable means. The baffles prevent the tomatoes from traveling along a straight path and thus extend the time in which they are in contact with the roughened surface of the belt 36. The baffles also cause more vigorous contact between the tomatoes and the belt and thus increase the efficiency of the peeling operation. Furthermore, each time a tomato strikes a baffle the frictional force applied to the skin by the belt is in a different direction, since the tomato is deflected across the moving belt rather than merely traveling in one direction with respect to the direction of belt movement. In FIGURE 3 a typical illustration is shown in which a tomato T is shown being deflected by a baffle 62 across the belt 36. The direction of travel of the tomato is indicated by an arrow M whereas the direction of the frictional force as applied to the skin of the tomato by the belt is indicated by an arrow F. When the tomato leaves the baffle the direction of the friction force is at an angle with respect to the direction of tomato travel and more effectively removes the tomato skin.

Similarly, the pins 64 which are positioned between the baffles 62, further impede the travel of the tomatoes along the inclined path. The pins 64 are fastened on the transverse bars 63 as by welding. The purpose of the pins 64 is, likewise, to extend the length of time in which the roughened surface of the belt may contact the loosened skin of the tomato. By the time the tomato reaches the lower end of the belt 36, adjacent the immersing unit 30, substantially all the skin has been peeled from the fruit portion of the tomato.

As is best shown in FIGURES 2 and 3, a plurality of nozzles 68 are connected on a transverse water pipe 70 which is connected to the frame 20 in a position overlying the belt, by any suitable means. The pipe 70 is connected by a conduit 72 to a source of water under pressure. The nozzles 68 direct a spray of water on the tomatoes traveling down the belt, rinsing the peeled tomatoes and applying a thin film of water onto the surface of the belt 36. As the skins are disengaged from the body of the fruit, the peels adhere to the belt and to the thin film of water and are carried out of the path of the body portion of the tomato.

Positioned beneath the roller 38 and in a position to engage the outer surface of the belt 36 is a flexible resilient scraper 74 which is mounted on the frame 20 above the side wall 76 of a flume 78. The flume 78 includes another side wall 80 and a bottom wall 81 secured to the frame 20. The bottom wall 81 is connected in fluid tight relation to the side walls 76 and 80. The scraper 74 engages the peelings, which are partially floating on the thin film of water and carried by the outer surface of the belt 36, and deflects them into the flume 78 where they are subsequently discharged as by flushing with water. Consequently, the outer surface of the belt 36 is substantially cleared of peelings prior to its travel along the upper run. Since it is imperative that the skins of the fruit be contacted by a roughened surface, this clearing action by the scraper 74 maintains the roughened surface of the belt effective for removing the skins from the tomatoes.

The immersion section 30 will now be described and as best shown in FIGURE 2 comprises a tank 82 positioned below the roller 48 and having a bottom wall 86, two upstanding side walls 88 (FIG. 3), and two upstanding end walls 90, only one being shown. The tank is filled with water from a source, not shown, and serves to rinse the substantially peeled tomatoes prior to a further processing step. The tomatoes passing along the baffles 62 are discharged into the tank 82 at the lower end of the belt 36 and are deflected by a plate 92, fastened to one of the end walls 90, onto the upwardly inclined conveyor 32.

The belt of conveyor 32 is trained about an idler roller 96 that is keyed on a shaft 97 which is journalled on the frame 20 and about an upper power-driven drive roller, not shown. A plurality of appendages or shelves 98 are provided on the outer surface of the conveyor 32 in upstanding relation thereto in a manner well known in the art. As the tomatoes are deflected by the plate 92, they are carried upwardly by the appendages on the conveyor 32 and moved to a subsequent handlings station, not shown.

In carrying out the method the tomatoes which have been treated in the tank 25 and the inclined portion 26 are carried by the conveyor 21 to the skin eliminating section 28. The tomatoes are dropped from the conveyor 21 and strike the chute 52, where an initial breaking of the skin occurs, and are then deflected onto the upper run of the belt 36. Due to the inclination of the upper run of the belt 36, the tomatoes begin to slide or tumble down the inclined path until they are engaged by the curtain 60 and momentarily stopped until the moving roughened surface of the belt 36 causes them to begin a pure tumbling action. As the tomatoes leave the curtain 60 they are tumbled along and their paths are obstructed and delayed by the baffles 62 and the pins 64 so that the roughened surface of the belt 36 has sufficient time to engage the loosened skins of the tomatoes and remove them from the fruit portion. Each time the tomatoes strike a baffle and are deflected in a different direction they travel across the moving belt at a different angle resulting in a change in direction between the motion of the tomatoes and the frictional force as applied by the belt. The relative change in direction between the tomatoes and the moving belt causes a more vigorous and rapid peeling action. Also, upon each change of direction the tomato is slowed, however, since the belt is moving at a constant fast speed the belt further tends to move the skin faster than the body of the tomato and thus separate the skin from the tomato.

The inclination of the upper run of the belt 36 and the speed with which it travels may be varied depending upon the type of fruit being peeled. In one arrangement for the VF-145 variety tomato, the optimum conditions were an angle of 28 degrees, using an eight foot rolling section for the upper run of the belt 36 and a belt speed of 300 feet per minute. The more baffles used, the faster the speed of rotation of the belt, and the greater the angle of inclination of the belt, all are factors which increase the amount of contact by the roughened surface of the belt and causes more vigorous peeling action. Consequently, should the fruit being processed have a skin which is not readily removed, the adjustment of any one, or all, of these three aforementioned features may be changed to provide a more extensive and vigorous contact. Conversely, when the skin of the fruit is very fragile and easily removable, the belt angle and speed may be decreased. The above three features; namely, the belt angle of inclination, the belt speed, and the number of baffles are not critical; however, as aforementioned, there are optimum conditions for each different variety of fruit being peeled.

Upon leaving the belt 36, the peeled tomatoes fall into the immersion unit 30 where any remaining traces of lye or loose bits of peel are removed. The tomatoes are then carried by the conveyor 32 to another station in the processing line, not shown, where a subsequent operation, such as a final trimming and packing is performed.

A modified form of the belt cleaning portion of the eliminator is shown in FIGURE 5. In this embodiment, the flexible scraper 74 and the flume 78 are removed. As a substitute therefor, two additional side walls, only one being shown as at 100, are connected to the end wall 90 of the tank 82. An additional end wall 102 is added connecting the side walls and a bottom wall 104 in fluid tight relation to form a washing tank 99. The end walls 90 and 102, the side wall 100 and the other side wall, not shown, are high enough so as to support a column of water supplied either from a source, not shown, or from the water which spills over the end wall 90, such that the lower portion of the roller 48 and the belt 36 are immersed in the water column. The end wall 102 is slightly lower than the end wall 90, and is provided with a spillway 105 which guides the overflow of water into the flume 106. The flume 106 is substantially identical to the previously described flume 78 of the preferred embodiment. It should suffice to say that the flume 106 also is provided with a pair of inclined side walls 108 and 110 which are connected by a bottom wall 112. The bottom wall 112 is also fastened to the frame 20 at an angle such that peelings which are washed into the flume over the spillway 105 may be flushed to a disposal area.

The method may also be carried out on the modified embodiment since it operated identically to the preferred embodiment with the exception that instead of the peelings being scraped from the belt by the rubber scraper 74, they are retained on the lower run of the belt 36 and pass into the column of water supported in the tank 99. As the peelings are carried into the column of water they are washed from the belt 36 and float over the spillway 105 into the flume 106, thus leaving the belt in a substantially cleaned condition as it begins the upper run.

From the foregoing description it will be apparent that the present method provides an effective, inexpensive mode of removing the skins from caustically treated tomatoes and that the method may be employed on various other forms of equipment.

It will be understood that the principles of the invention are also applicable for tomatoes which have cores and are first subjected to a coring or cutting operation before being peeled or for tomatoes which have cores but are not first subjected to a coring or cutting operation. However, since tomatoes which are first cored are weakened structurally, it is necessary to coordinate the speed, angle and length of the belt for less vigorous handling than in the case where coreless or uncored tomatoes are being peeled.

It will be understood that modifications and variations of the invention disclosed herein may be made without departing from the scope of the present invention.

Having completed a detailed description of the invention so that those skilled in the art could practice the same, I claim:

1. The method of removing the skin from lye treated tomatoes or the like including the steps of rolling the tomatoes down an unsubmerged, firm, upwardly moving friction surface and causing sufficiently rapid relative motion of the tomatoes and said friction surface to break the tomato skin but without piercing the skin by the friction surface and thereby damaging the fruit; and simultaneously causing centrifugal flinging of dislodged skins from the rotating tomatoes.

2. The method of claim 1, including the steps of directing a spray of water on the tomatoes as they roll down said upwardly moving friction surface for rinsing the tomatoes and causing the dislodged skins to adhere to a thin film of water on said moving surface, and removing the skins from the spray zone via said moving surface.

3. The method of claim 1, comprising intermittently and momentarily impeding the rolling motion of the tomatoes down said upwardly moving friction surface for further breaking loose the tomato skins from the fruit.

References Cited

UNITED STATES PATENTS

| | | | |
|---|---|---|---|
| 1,394,138 | 10/1921 | Bost et al. | 146—233 X |
| 3,017,298 | 1/1962 | Wilson et al. | 146—234 |
| 3,024,821 | 3/1962 | Bean | 146—49 |

W. GRAYDON ABERCROMBIE, *Primary Examiner.*